US009584560B2

(12) United States Patent
Ezell

(10) Patent No.: US 9,584,560 B2
(45) Date of Patent: Feb. 28, 2017

(54) PROVIDING EXTERNAL APPLICATION SERVICES WITH AN EXISTING PRIVATE BRANCH EXCHANGE MEDIA SERVER

(71) Applicant: Avaya Inc., Santa Clara, CA (US)

(72) Inventor: Joel Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 365 days.

(21) Appl. No.: 14/445,380

(22) Filed: Jul. 29, 2014

(65) Prior Publication Data

US 2016/0036864 A1    Feb. 4, 2016

(51) Int. Cl.
*H04L 29/06* (2006.01)
*H04L 12/28* (2006.01)
*H04M 7/00* (2006.01)

(52) U.S. Cl.
CPC ....... *H04L 65/1069* (2013.01); *H04L 65/1053* (2013.01); *H04L 65/1063* (2013.01); *H04L 65/1093* (2013.01); *H04L 65/403* (2013.01); *H04M 7/0039* (2013.01)

(58) Field of Classification Search
USPC ....... 709/227, 203, 204, 223, 229, 228, 231, 709/213
See application file for complete search history.

(56) References Cited

U.S. PATENT DOCUMENTS

| | | | | |
|---|---|---|---|---|
| 5,949,977 A * | 9/1999 | Hernandez | ............ | G06F 9/5044 709/203 |
| 6,798,874 B1 * | 9/2004 | Ohlinger | ............ | H04M 3/42153 379/201.01 |
| 7,068,680 B1 * | 6/2006 | Kaltenmark | ............ | H04L 67/14 370/469 |
| 2002/0181460 A1 * | 12/2002 | Strathmeyer | ............ | H04L 29/06 370/389 |
| 2008/0208605 A1 * | 8/2008 | Sinha | ............ | G06Q 10/10 705/1.1 |
| 2015/0358361 A1 * | 12/2015 | Balasaygun | ............ | H04L 65/1069 709/228 |

* cited by examiner

*Primary Examiner* — Jude Jean Gilles
(74) *Attorney, Agent, or Firm* — Sheridan Ross P.C.

(57) ABSTRACT

A solution is provided that integrates external services with existing PBX services to provide new features to the PBX without having to update the PBX. To provide the external services, an external application server establishes a Computer Telephone Integration (CTI) channel with the PBX in order to register for one or more events that occur for a communication session controlled by the PBX. When one of the events occurs, the PBX sends a token containing information regarding the communication session and a media server associated with the communication session. The external application server uses the information in the token to provide an external service, via an external application, to a media stream of the communication session. In one embodiment, the media stream may be sent to that external application that provides the service to the communication session.

20 Claims, 7 Drawing Sheets

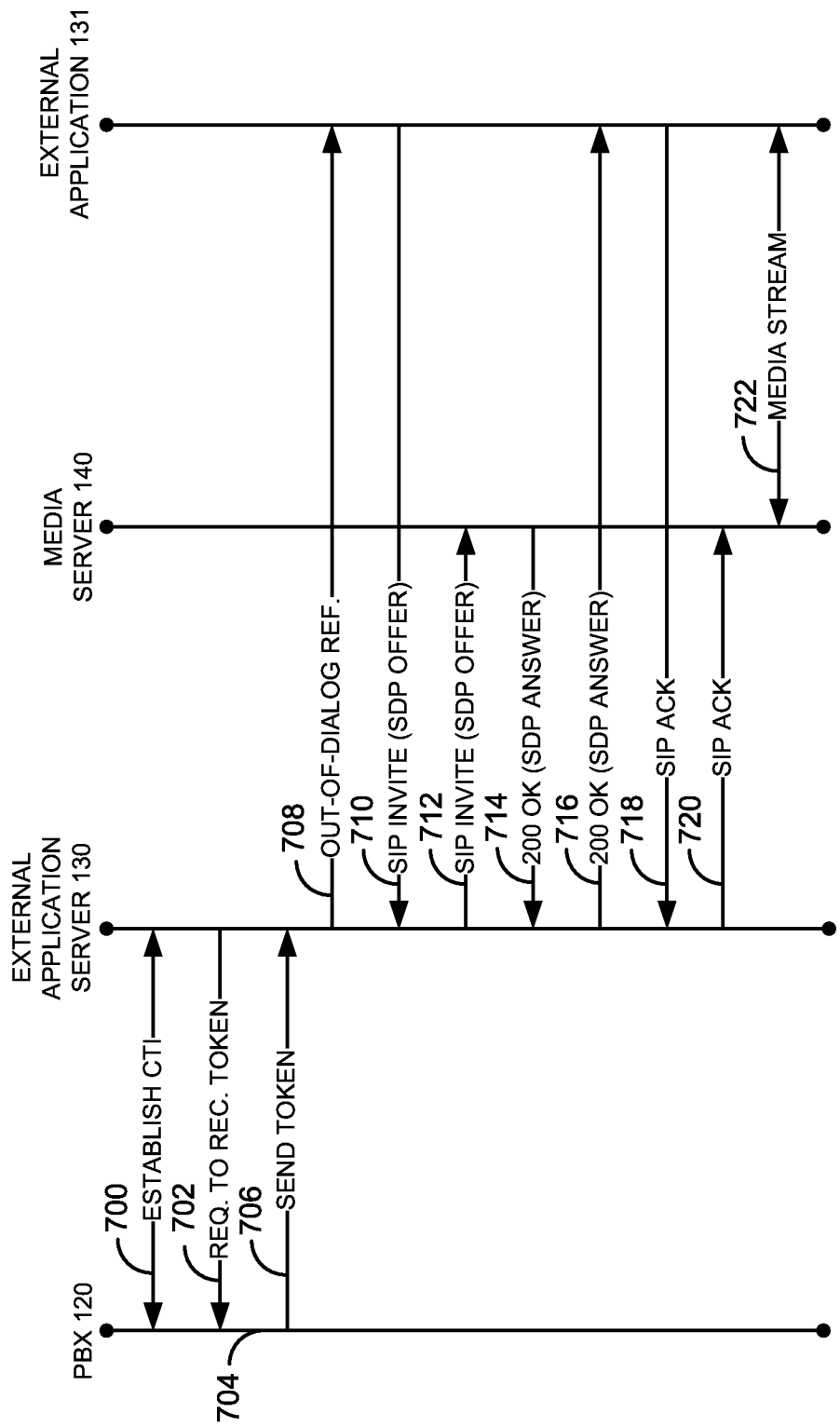

PROVIDING EXTERNAL APPLICATION SERVICES WITH AN EXISTING PRIVATE BRANCH EXCHANGE MEDIA SERVER

TECHNICAL FIELD

The systems and methods disclosed herein relate to communication system and in particular to providing services external to a communication system.

BACKGROUND

It has traditionally been very difficult to get access to media streams in a PBX environment. Even if an application has gained access to a media stream using traditional means, the actions that can be taken on the media stream are limited to existing services provided by the PBX.

One way that has been used to address this issue is to use a control API that allows applications to register a virtual station and then conference the virtual station into an existing call. The downside of this approach is that the application is limited to actions that can be performed via a station interface.

Another alternative is to split a call to a PBX into two halves so the media between the two call halves can be managed. The downside with this approach is that the half call model breaks many existing PBX features. In addition, when a call is split into two halves, twice as many PBX resources are required for each call and additional call latency is introduced.

SUMMARY

Systems and methods are provided to solve these and other problems and disadvantages of the prior art. A solution is provided that integrates external services with existing PBX services to provide new features to the PBX without having to update the PBX. To provide the external services, an external application server establishes a Computer Telephone Integration (CTI) channel with the PBX in order to register for one or more events that occur for a communication session controlled by the PBX. When one of the events occurs, the PBX sends a token containing information regarding the communication session and a media server associated with the communication session. The external application server uses the information in the token to provide an external service, via an external application, to a media stream of the communication session. In one embodiment, the media stream may be sent to that external application that provides the service to the communication session.

BRIEF DESCRIPTION OF THE DRAWINGS

FIG. 7 is a flow diagram of a process for providing external services to a communication session via SIP.

DETAILED DESCRIPTION

Figure 1:
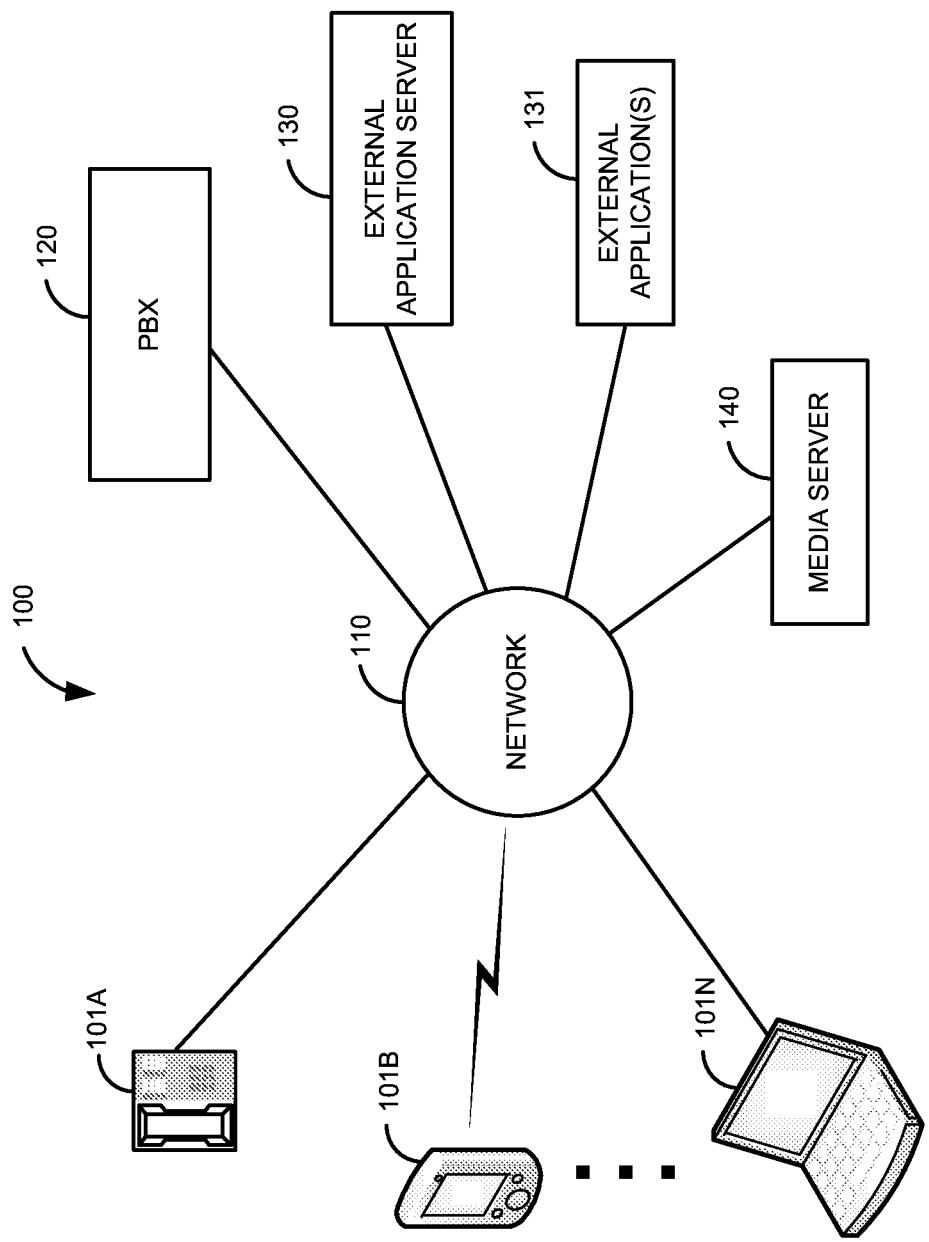
FIG. 1 is a block diagram of a first illustrative system for providing external services to a communication session.

FIG. 1 is a block diagram of a first illustrative system 100 for providing external services to a communication session. The first illustrative system 100 comprises communication endpoints 101A-101N, a network 110, a Private Branch Exchange (PBX) 120, an external application server 130, an external application(s) 131, and a media server 140.

The communication endpoints 101A-101N can be or may include be any device that is an endpoint in a communication session, such as a Personal Computer (PC), a telephone, a video system, a cellular telephone, a Personal Digital Assistant (PDA), a tablet device, a notebook device, a video server, a media streamer, and/or the like. As shown in FIG. 1, any number of communication endpoints 101A-101N may be connected to the network 110, including only a single communication endpoint 101. In addition, any number of the communication endpoints 101A-101N may be directly connected to the PBX 120.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of protocols, such as Ethernet, Internet Protocol (IP), Session Initiation Protocol (SIP), Integrated Services Digital Network (ISDN), H.323, video protocols, text protocols, Instant Messaging protocols, and/or the like.

The PBX 120 can be or may include any collection of communication equipment that can establish one or more communications sessions between two or more communication endpoints 101A-101N, such as a communication manager, a central office switch, a video switch, an Instant Messaging (IM) server, and/or the like.

The external application server 130 can be any server that can provide one or more external applications 131 that are external to the PBX 120. The external application server 130 is a separate application server from the PBX 120. For example, the external application server 130 is typically added after the PBX 120 is implemented at a customer site to provide new services that are not included in the PBX 120.

The external application(s) 131 can include, but are not limited to a variety of different services, such as, a recording service, an announcement service, a Dual Tone Multi-Frequency (DTMF) capturing service, a real-time speech detection service, a key word detection service, a transcription service, a gesture recognition service, a whisper service, a service to join a third communication endpoint 101 to the first communication session, and/or the like. In FIG. 1, the external application(s) 131 are shown to be separate from the external application server 130.

The media server 140 can be any hardware/software that can provide services for a media stream. For example, the media server 140 can provide services for voice communication sessions, video communication sessions, text communication sessions, Instant Messaging (IM) communication sessions, and/or the like. The services can be the services that are provided by the external application(s) 131.

Figure 2:
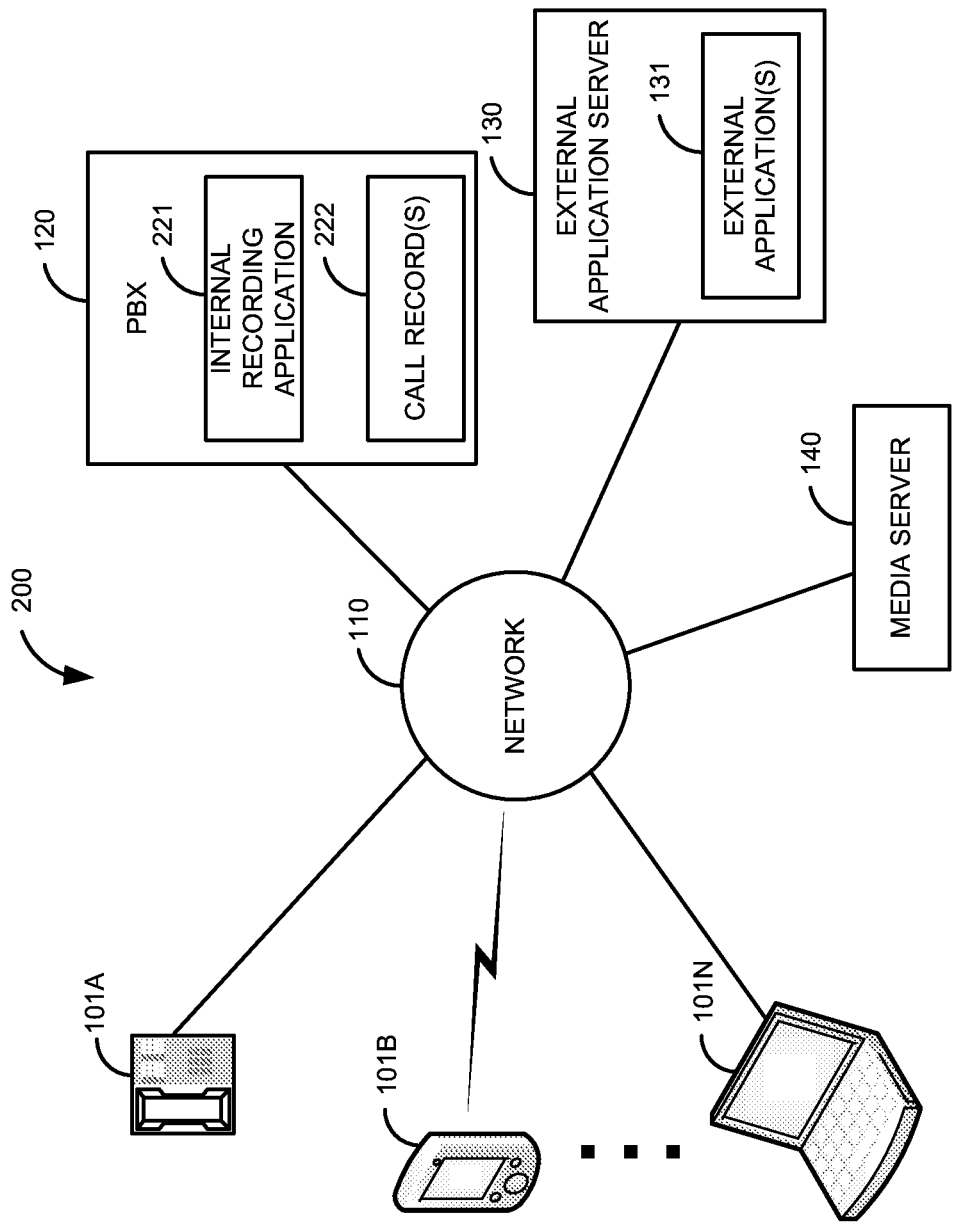
FIG. 2 is a block diagram of a second illustrative system for providing external services to a communication session.

FIG. 2 is a block diagram of a second illustrative system 200 for providing external services to a communication session. The second illustrative system 200 comprises the communication endpoints 101A-101N, the network 110, the PBX 120, the external application server 130, and the media server 140.

The PBX 120 further comprises an internal recording application 221 and call record(s) 222. The internal recording application 221 can be or may include any hardware/software that can record calls under the control of the PBX 120.

The call record(s) 222 includes information for one or more communication sessions. The communication sessions can be voice, video, text, IM communication sessions, and/or the like. The call record(s) 222 can include information, such as participants in the communication session, applications included in the communication session, a duration of the communication session, a start/end time of the communication session, Dual-Tone Multiple Frequency (DTMF) tones collected in the communication session, whisper sessions created, recognized gestures, transcription information, detected words, and/or the like.

In FIG. 2, the external applications 131 are shown as part of the external application server 130. However, as described in FIG. 1, the external application(s) can be separate from the external application server 130.

Figure 3:
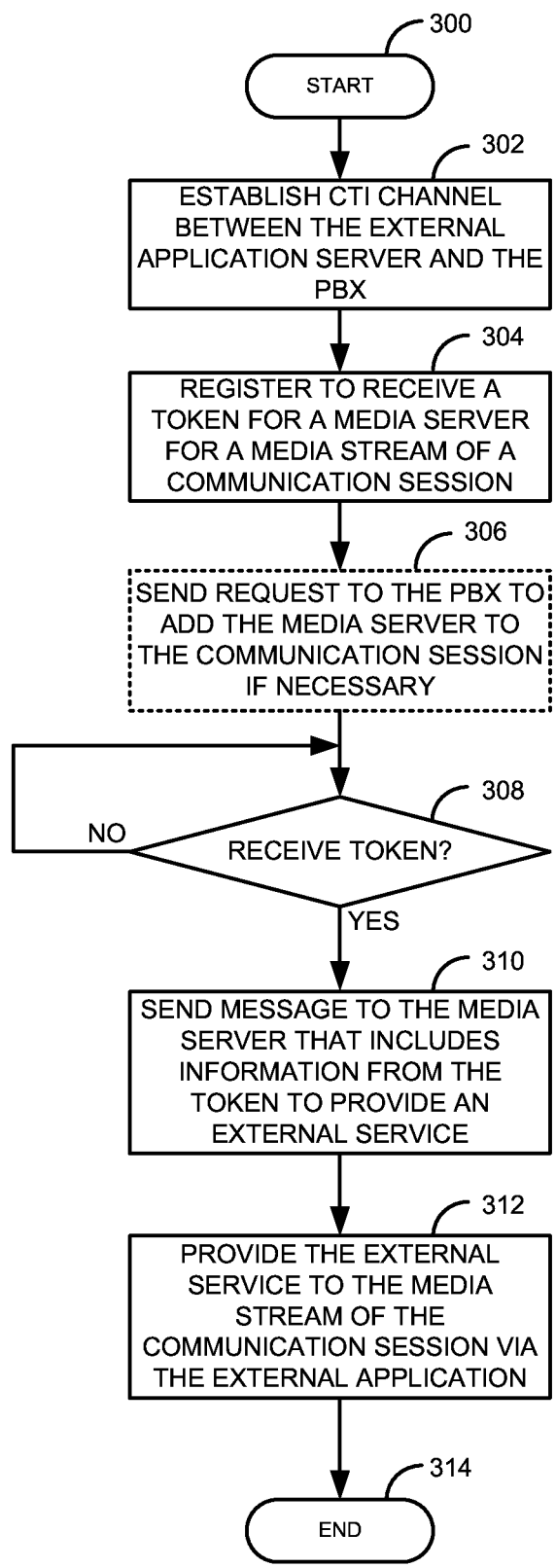
FIG. 3 is a flow diagram of a process for providing external services to a communication session.

FIG. 3 is a flow diagram of a process for providing external services to a communication session. Illustratively, the communication endpoints 101A-101N, the PBX 120, the internal recording application 221, the external application server 130, the external application(s) 131, and the media server 140 are stored-program-controlled entities, such as a computer or processor, which performs the method of FIGS. 3-7 and the processes described herein by executing program instructions stored in a tangible computer readable storage medium, such as a memory or disk. Although the methods described in FIGS. 3-7 are shown in a specific order, one of skill in the art would recognize that the steps in FIGS. 3-7 may be implemented in different orders and/or be implemented in a multi-threaded environment. Moreover, various steps may be omitted or added based on implementation.

The process starts in step 300. A Computer Telephone Integration (CTI) channel is established between the external application server 130 and the PBX 120 in step 302. The CTI channel can be established by the external application server 130 initiating a request to establish the CTI channel. Alternatively, the PBX 120 can initiate the request to establish the CTI channel.

The external application server 130 registers with the PBX 120 to receive a token for a media server 140 in step 304. The media server 140 is associated with one or more media streams of a communication session between two or more communication endpoints 101 that is established by the PBX 120. In one embodiment, the request to register to receive the token for the media server 140 is for an existing communication session. The external application server 130 can query the PBX 120 to identify a particular communication session. For example, the external application server 130 can query the PBX 120 to see if there is a communication session between the communication endpoints 101A and 101B, query the PBX 120 to see what communication sessions currently involve the communication endpoint 101B, query the PBX 120 to see if any existing communication sessions are being recorded, query the PBX 120 to see if there is an Instant Messaging or video session involving a specific user and/or the like. The external application server 130 can then see if the existing communication session has a media server 140. If the existing communication session does not currently have a media server 140, the external application server 130 can send a request to the PBX 120 to add the media server 140 the existing communication session in step 306.

Alternatively, the external application server 130 can register with the PBX 120 based on an event that may occur in an existing communication session. For example, the external application server 130 can register to receive the token when a particular word is spoken in a voice communication session, when a gesture is made during video communication session, when a particular word is sent in an IM session, when a particular DTMF sequence is entered during a communication session, based on an input from a user, and/or the like. The external application server 130 sends a request to the PBX 120 to add the media server 140 to the existing communication session if the existing communication session does not currently have a media server 140 in step 306.

In another embodiment, the request to register to receive the token for the media server 140 can be for a future communication session. For example, the external application server 130 can register to receive the token when a communication session is established between a particular set of communication endpoints 101, when a communication session is established by a particular user or the communication endpoint 101, when a particular communication endpoint 101 or user is conferenced onto an existing communication session, and/or the like. The external application server 130 can send a request to the PBX 120 to add the media server 140 to the communication session if the future communication session will not have a media server 140. For example, the request to register to receive the token can include the request to add the media server 140 when the communication session is created.

The external application server 130 waits in step 308 to receive the token. If the token has not been received in step 308, the process waits to receive the token in step 308. If the token has been received in step 308, the external application server 130 sends a message to the media server 140 that includes information in the token to provide an external service in step 310. For example, the external application server 130 can send a message to the media server 140 using Media Server Markup Language (MSML) that includes information from the token. The information taken from the token may include a conference identifier, an Internet Protocol (IP) address of the media server 140, a port of the media server 140, an identifier of a first communication endpoint 101 involved in the communication session, an identifier of a second communication endpoint 101 involved in the communication session, and/or the like. This allows the external application(s) 131 to communicate directly with the media server 140 to provide the external service(s) to the media stream of the communication in step 312. The process then ends in step 314.

To illustrate, consider the followings examples. The external application server 130 establishes a CTI channel with the PBX 120 in step 302. The external application server 130 queries the PBX 120 to see if there is a voice communication session involving the communication endpoint 101A. The PBX 120 responds that there is one communication session involving the communication endpoint 101A. The external application server 130 registers to receive a token for the media server 140 for a media stream of the communication session involving the communication endpoint 101A in step 304. In this example, the communication session already has the media server 140 so step 306 is not necessary. The external application 130 receives the token that includes information about the media server 140 involved in the communication session with the communication endpoint 101A in step 308. The external application 130 sends a message to the media server 140 that includes information from the token. The message is to provide an external notification service application 131 to the communication session in step 310. The external notification service application 131 sends a message for the media server 140 to broadcast in the stream of the communication session involving the communication endpoint 101A.

In another exemplary embodiment, the external application server 130 establishes a CTI channel with the PBX 120 in step 302. The external application server 130 registers to receive a token for a media server 140 for a media stream of a communication session based on an event that occurs within the media stream in step 304. The event is to detect a specific gesture or word spoken in a communication session between an agent and a customer in a contact center. In this example, the communication session already has a media server 140 so step 306 is unnecessary. Upon detection of the gesture or word, the external application server 130 receives the token in step 308. The external application server 130 sends a message to the media server 140 that includes information from the token to provide a whisper service (sending a voice whisper to the agent that the customer does not hear) to the communication session between the agent and the customer in step 310. The whisper service application 131 sends a voice message to the agent to change a particular behavior of the agent based on the detected word or gesture.

In another exemplary embodiment, the external application server 130 establishes a CTI channel with the PBX 120 in step 302. The external application server 130 registers to receive a token from the PBX 120 based on a call being made from communication endpoint 101B in step 304. The registration message also includes a request to add the media server (step 306). Based on a call being made from the communication endpoint 101B, the external application server 130 receives the token in step 308. The external application server 130 sends the message to the media server 140 that includes information from the token in step 310. The external application provides an announcement service that identifies the user of the communication endpoint 101B to the other participants on the communication session.

In the above descriptions, the reference to the media stream is typically in reference to the media stream sent between the communication endpoints 101. However, in some embodiments, the external application(s) 131 can control a particular media stream between an individual communication endpoint 101 and the media server 140. For example, the whisper service application controls the media stream from the media server 140 to the agent in the contact center by whispering a message only to the agent and not the customer.

In some embodiments, the PBX 120 may be completely unaware that the external application is providing the service to the media stream of the communication session. For example, the external application 131 may be a recording application that records the communication session without the PBX's 120 knowledge.

Figure 4:
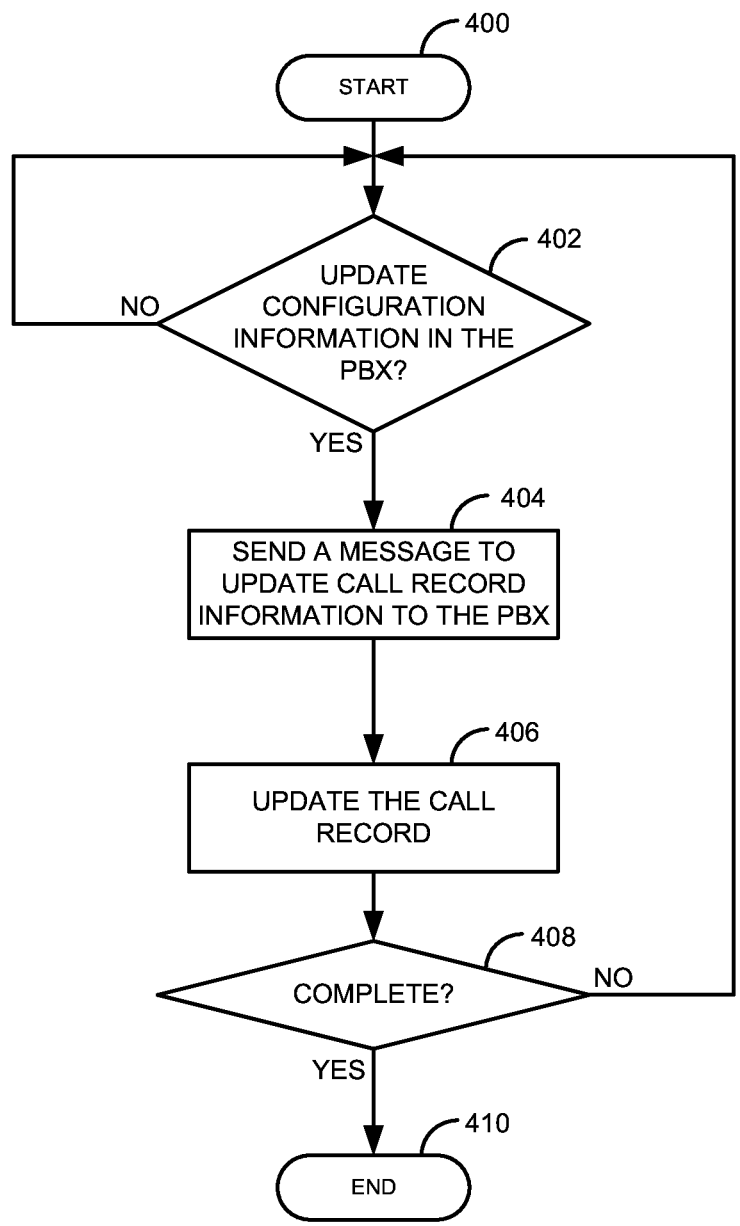
FIG. 4 is a flow diagram of process for updating a call record in a PBX based on an external application.

FIG. 4 is a flow diagram of process for updating a call record 222 in the PBX 120 based on an external application 131. The process starts in step 400. The process waits in step 402 to see if configuration information needs to be updated in the PBX 120. If no configuration information needs to be updated in step 402, the process repeats step 402. Otherwise, if there is configuration information to update in the PBX 120 in step 402, the external application server 130 sends a message to update the call record 222 in the PBX 120 in step 404. The PBX 120 updates the call record 222 in step 406. The process determines in step 408 if the process is complete. If the process is not complete, the process goes back to step 402. Otherwise, if the process is complete, the process ends in step 410.

To illustrate, consider the following examples. The PBX 120 uses an internal recording application 221 to record a media stream of a first communication session. The internal recording application 221 records the first communication session and updates the call record 222 to indicate the recording of the first communication session by the internal recording application 221. The process of FIG. 3 establishes an external recording application (131) that records a second communication session external to the PBX 120. In response, the external application sever 130 sends a message to the PBX 120 via the CTI channel to update the call record 222 to indicate that the second communication session was recorded by the external recording application (131).

In another embodiment, the external application 131 is a DTMF capturing service that captures DTMF tones in the communication session. In response to the DTMF tones being captured, the external application server 130 sends a message, via the CTI channel, to update the call record 222 in the PBX 120 to include information regarding the captured DTMF tones.

In another embodiment, the external application 131 is an application that joins another communication endpoint 101 to a communication session. For example, the communication endpoint 101N is joined to a communication session between the communication endpoints 101A and 101B. In response to joining the communication endpoint 101N to the communication session, the external communication application 130 send a message to the PBX 120 to update the call record 222 to indicate that the communication endpoint 101N joined the communication session between the communication endpoints 101A and 101B.

In addition to the above descriptions of updating the call record 222, the call record 222 can be updated based upon actions taken by the external applications 131, such as, based on an announcement made during the communication session, based on real-time speech detection, based on keyword detection, based on a text transcription, based on detection of one or more gestures in the communication session, based on a whisper application sending a particular whisper to a user (the call record 222 can include a text representation of the whisper), based on a network analyzer capturing packets of the communication session (the packets can be stored in the call record), based on a network analyzer capturing events in that occur in a communication device 101 (e.g., a button push or internal timer expiring) and/or the like.

Figure 5:
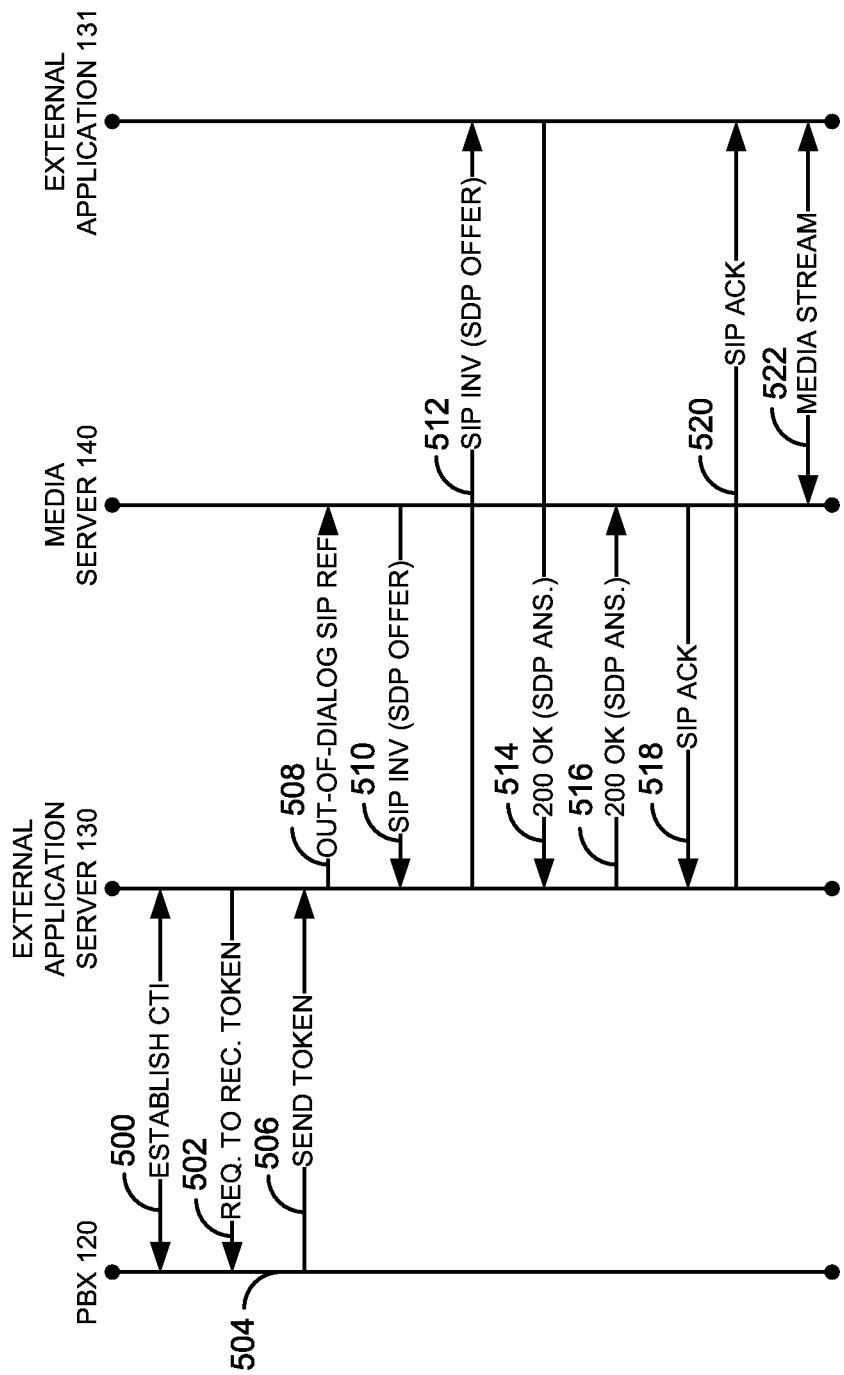
FIG. 5 is a flow diagram of a process for providing external services to a communication session via Session Initiation Protocol (SIP).

FIG. 5 is a flow diagram of a process for providing external services to a communication session via Session Initiation Protocol (SIP). The PBX 120 and the external application server 130 establish a CTI channel in step 500. The external application server 130 sends a request to receive a token that includes information about the media server 140 in step 502. This request may also include a request to add the media server 140 to the communication session. In response to an event in step 504, the PBX 120 sends the token to the external application server 130 in step 506. The external application server 130 sends an out-of-dialog SIP REFER message to the media server 140 in step 508. The external application server 130 sends the out-of-dialog SIP REFER based information in the token (e.g., an IP address/port of the media server 140, a session identifier, etc.). For example, by using the IP address/port of the media server 140 to identify the address to send the out-of-dialog SIP REFER. In one embodiment, the message can be a slow start SIP INVITE.

The media server 140 sends a SIP INVITE with a Session Description Protocol (SDP) offer to the external application server 130 in step 510. The external application server 130 sends the SIP INVITE with the SDP offer to the external application 131 in step 512. The external application 131 responds by sending a SIP 200 OK message with a SDP answer in step 514. The external application server 130 sends the SIP 200 OK message with the SDP answer to the media server 140 in step 516. The media server 140 sends a SIP ACK message to the external application server 130 in step 518. The external application server 130 sends the SIP ACK to the external application 131 in step 520. At this point, the media server 140 sends the media stream to the external application 131 in step 522.

In one embodiment, the SIP INVITE sent in step 512 is sent using the SIP recording (SIPREC) protocol to the external application 131 which is a SIP recording application. The SIP INVITE based on the SIPREC protocol is used to setup the recording session between the media server 140 and the SIP recording application (131).

Figure 6:
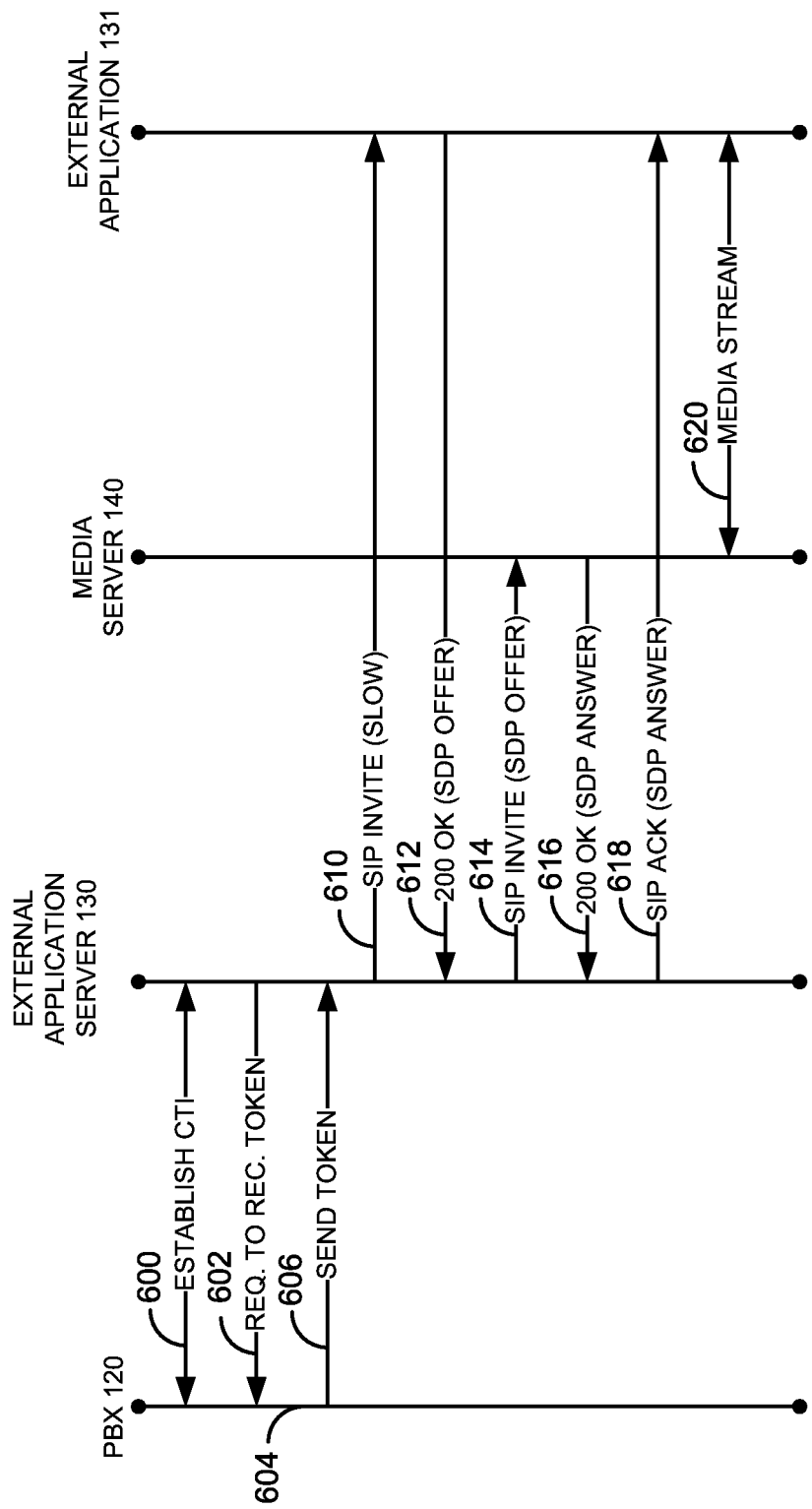
FIG. 6 is a flow diagram of a process for providing external services to a communication session via SIP.

The processes of FIGS. 5-7 are used in situations of where a communication endpoint 101, a recording application, or some other external application 131 needs to receive the media stream of the communication session. In other embodiments, where the external application 131 does not need to receive the media stream, the external application 131 can just send a message to the media server 140 to provide the external service to the media stream. For example, if the external application 131 is an announcement service, the announcement service can send a message to the media server 140 to broadcast the announcement to all the users of the communication session without having to receive the media stream.

FIG. 6 is a flow diagram of a process for providing external services to a communication session via SIP. The PBX 120 and the external application server 130 establish a CTI channel in step 600. The external application server 130 sends a request to receive a token that includes information about the media server 140 in step 602. This request may also include a request to add the media server 140 to the communication session. In response to an event in step 604, the PBX 120 sends the token to the external application server 130 in step 606.

The external application server 130 sends a slow start SIP INVITE to the external application 131 in step 610. A slow start SIP INVITE is a SIP INVITE that does not contain an SDP offer. The external application 131 sends a SIP 200 OK with an SDP offer in step 612. The external application server 130 sends a SIP INVITE with the SDP offer received from the SIP 200 OK message (step 612) to the media server 140 in step 614. The media server 140 responds by sending a SIP 200 OK with an SDP answer to the external application 130 in step 616. The external application 130 sends a SIP ACK with the SDP answer (from the SIP 200 OK message in step 616) to the external application 131 in step 618. The external application 131 receives the media stream for the communication session from the media server 140 in step 620.

FIG. 7 is a flow diagram of a process for providing external services to a communication session via SIP. The PBX 120 and the external application server 130 establish a CTI channel in step 700. The external application server 130 sends a request to receive a token that includes information about the media server 140 in step 702. This request may also include a request to add the media server 140 to the communication session. In response to an event in step 704, the PBX 120 sends the token to the external application server 130 in step 706.

The external application sends an out-of-dialog SIP REFER message to the external application 131 in step 708. The external application 131 sends a SIP INVITE with a SDP offer to the external application server 130 in step 710. The external application server 130 sends a SIP INVITE with the SDP offer to the media server 140 in step 712. The external application 130 uses information from the token (e.g., an IP address/port of the media server 140, a session identifier, etc.) to send the SIP INVITE with the SDP offer to the media server 140. The media server 140 sends a SIP 200 OK with a SDP answer to the external application server 130 in step 714. The external application server 130 sends the SIP 200 OK with the SDP answer to the external application 131 in step 716. The external application 131 sends a SIP ACK to the external application 130 in step 718. The external application 130 sends the SIP ACK to the media server 140 in step 720. The external application 131 receives the media stream for the communication session from the media server 140 in step 722.

In another embodiment, instead of the external application server 130 sending the out-of-dialog SIP REFER in step 708, the external application 131 initiates the process to receive the media stream of the communication session by sending the SIP INVITE with the SDP offer in step 710. The process then flows in the same manner as shown in steps 712-722. The external application 131 can initiate the process (sending the SIP INVITE in step 710) based on different events; for example, the external application 131 can monitor CTI events sent from the PBX 120. The external application 131 can initiate the process based on input from a user, based on a defined event in the external application, and/or the like. A defined event can be based on an external event, such as, a weather event, a stock market event, a corporate event, and/or the like.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising:
   an external application server configured to receive a token, via a Computer Telephone Integration (CTI) channel between a PBX and the external application server, wherein the token includes information about a media server for a first media stream of a first communication session between a first communication endpoint and a second communication endpoint, and send a message to the media server using information from the token to provide an external service for the first media stream of the first communication session; and
   an external application configured to provide the external service to the first media stream of first communication session.

2. The system of claim 1, wherein the PBX is unaware of the external application providing the external service to the first communication session.

3. The system of claim 1, wherein the token comprises: a conference identifier, an Internet Protocol (IP) address of the media server, a port of the media server, an identifier of the first communication endpoint, and an identifier of the second communication endpoint.

4. The system of claim 1, wherein the message is a an out-of-dialog SIP REFER message and wherein the external application server is further configured to receive a SIP INVITE with a Session Description Protocol (SDP) offer, send the SIP INVITE with the SDP offer to the external application, receive a 200 OK message with a SDP answer from the external application, and send the 200 OK message with the SDP answer to the media server.

5. The system of claim 1, wherein the message is a SIP INVITE message containing a Session Description Protocol (SDP) offer or a slow start SIP INVITE.

6. The system of claim 1, wherein the external service is one or more of: a recording service, an announcement service, a Dual Tone Multi-Frequency (DTMF) capturing service, a real-time speech detection service, a key word detection service, a transcription service, a gesture recognition service, a whisper service, a network analysis service, and a service to join a third communication endpoint to the first communication session.

7. The system of claim 1, wherein the external service is an external recording service that uses a Session Initiation Protocol Recording (SIPREC) protocol.

8. The system of claim 7, wherein the PBX uses an internal recording service for a second communication session and wherein the PBX is configured to receive, via the CTI channel, information regarding a recording of the first media stream of the first communication session, and consolidate a call record with the information regarding the recording of the first media stream of the first communication session and information regarding a recording of a second media stream of the second communication session.

9. The system of claim 1, wherein the external service is a Dual Tone Multi-Frequency (DTMF) capturing service and wherein the PBX is configured to receive, via the CTI channel, information regarding one or more DTMF tones that were captured as part of the first media stream of the first communication session, and include the information regarding the one or more DTMF tones that were captured as part of the first media stream of the first communication session as part of a call record associated with the first communication session.

10. The system of claim 1, wherein the external service joins a third communication endpoint to the first communication session and wherein the PBX is configured to receive, via the CTI channel, information regarding the third communication endpoint that joined the first communication session, and update a call record to indicate that the third communication endpoint joined the first communication session.

11. The system of claim 1, wherein the external application server sends a request to the PBX to add the media server to the first communication session.

12. The system of claim 1, wherein the token is received based on one or more of the following: a query for the first communication session, an event in the first communication session, and an establishment of the first communication session.

13. A method comprising:
receiving, a token, via a Computer Telephone Integration (CTI) channel between a PBX and a external application server, wherein the token is received at the external application server and wherein the token includes information about a media server for a first media stream of a first communication session between a first communication endpoint and a second communication endpoint;
sending a message, from the external application server to the media server using information from the token to provide an external service for the first media stream of the first communication session; and
providing the external service to the first media stream of first communication session via an external application.

14. The method of claim 13, wherein the PBX is unaware of the external application providing the external service to the first communication session.

15. The method of claim 13, wherein the message is a an out-of-dialog SIP REFER message and further comprising:
receiving, at the external application server, a SIP INVITE with a Session Description Protocol (SDP) offer;
sending, the SIP INVITE with the SDP offer to the external application;
receiving, at the external application server, a 200 OK message with a SDP answer sent from the external application; and
sending the 200 OK message with the SDP answer to the media server.

16. The method of claim 13, wherein the external service is an external recording service that uses a Session Initiation Protocol Recording (SIPREC) protocol.

17. The method of claim 16, wherein the PBX uses an internal recording service for a second communication session and further comprising:
receiving, at the PBX, via the CTI channel, information regarding a recording of the first media stream of the first communication session; and
consolidating a call record in the PBX with the information regarding the recording of the first media stream of the first communication session and information regarding a recording of a second media stream of the second communication session.

18. The method of claim 13, wherein the external service is a Dual Tone Multi-Frequency (DTMF) capturing service and further comprising:
receiving, at the PBX, via the CTI channel, information regarding one or more DTMF tones that were captured as part of the first media stream of the first communication session; and
integrating the information regarding the one or more DTMF tones that were captured as part of the first media stream of the first communication session as part of a call record associated with the first communication session.

19. The method of claim 13, wherein the external service joins a third communication endpoint to the first communication session and further comprising:
receiving, at the PBX, via the CTI channel, information regarding the third communication endpoint that joined the first communication session; and
updating a call record, in the PBX, to indicate that the third communication endpoint joined the first communication session.

20. A non-transient computer readable medium having stored thereon instructions that cause a processor to execute a method, the method comprising:

instructions to receive a token, via a Computer Telephone Integration (CTI) channel between a PBX and a external application server, wherein the token is received at the external application server and wherein the token includes information about a media server for a first media stream of a first communication session between a first communication endpoint and a second communication endpoint;

instructions to send a message, from the external application server to the media server using information from the token to provide an external service for the first media stream of the first communication session; and instructions to provide the external service to the first media stream of first communication session via an external application.

* * * * *

UNITED STATES PATENT AND TRADEMARK OFFICE
CERTIFICATE OF CORRECTION

PATENT NO.        : 9,584,560 B2                           Page 1 of 1
APPLICATION NO.   : 14/445380
DATED             : February 28, 2017
INVENTOR(S)       : Joel Ezell It is certified that error appears in the above-identified patent and that said Letters Patent is hereby corrected as shown below:

At Column 8, Line 57, please delete "PBX" and insert --Private Branch Exchange (PBX)-- therein.

At Column 10, Line 3, please delete "PBX and a" and insert --Private Branch Exchange (PBX) and an-- therein.

At Column 11, Line 5, please delete "PBX and a" and insert --Private Branch Exchange (PBX) and an-- therein.

Signed and Sealed this
Second Day of May, 2017

Michelle K. Lee
*Director of the United States Patent and Trademark Office*